F. KADLEC.
MOTOR CAR.
APPLICATION FILED JUNE 26, 1914.
1,141,248. Patented June 1, 1915.
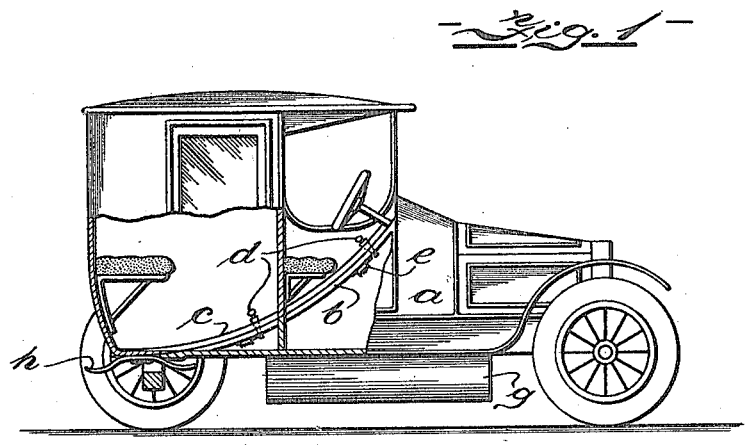
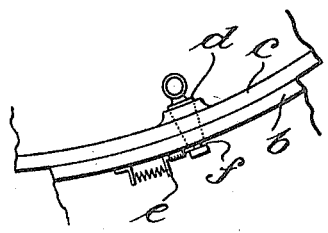
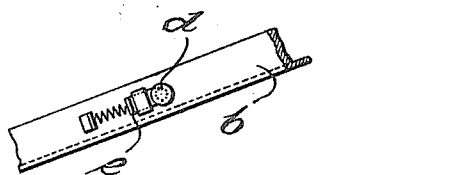

UNITED STATES PATENT OFFICE.

FRIEDRICH KADLEC, OF FIUME, AUSTRIA-HUNGARY.

MOTOR-CAR.

1,141,248. Specification of Letters Patent. Patented June 1, 1915.

Application filed June 26, 1914. Serial No. 847,432.

*To all whom it may concern:*

Be it known that I, FRIEDRICH KADLEC, a subject of the Austro-Hungarian Emperor, and resident of Fiume, Austria-Hungary, have invented Improvements in Motor-Cars, of which the following is a specification.

This invention relates to certain new and useful improvements in motor cars the improvements consisting therein that provision is made of means whereby the upper portion of the car accommodating the passengers is rendered detachable from the under frame so that in case of an accident, say when the brake fails to operate, the said upper portion may be released and made to detach itself and slide away from the under frame.

In the accompanying drawing:—Figure 1 shows a side view, partly in section, of a motor car with the said detaching means applied; Figs. 2 and 3 show details.

The under frame $a$ of the motor car has attached to either side a guide bar $b$ which is inclined and each of these bars serves to support another bar $c$ mounted on the corresponding side and at or near the base of the upper portion of the car giving accommodation to the passengers.

The guide bars $b$ and the bars $c$ are firmly connected by means of wedges $d$ which are securely held in position and locked by a bolt $e$, the latter being mounted beneath the guide bar and pressed into engagement with the recessed part $f$ provided at this end of the wedge.

The fuel container $g$ according to this arrangement is preferably fixed on the underside of the under frame of the car.

Assuming that the brake of the car fails to operate, say during the descent down a hill, the passengers or the driver has merely to disengage the wedges from the bars $b$ and $c$ whereupon the upper portion of the car detaches itself from the under frame and drops to the ground, springs $h$ attached at the under side of the upper portion preventing to a certain extent the shock and consequent injury to the passengers.

Having now fully described my said invention what I claim and desire to secure by Letters Patent is:—

The herein described improvements in motor cars, comprising the combination with the separate under frame and upper portion of the car, of a slanting guide bar attached to each side of the said under frame, another bar resting on each of the guide bars, wedges connecting each pair of bars, and a spring influenced bolt to keep the wedges normally in engaged position, all as and for the purpose set forth.

In testimony whereof I have hereunto set my hand in the presence of two subscribing witnesses.

FRIEDRICH KADLEC.

Witnesses:
A. W. PAHKNEY,
ATTILIO J. CLEMENTI.

Copies of this patent may be obtained for five cents each, by addressing the "Commissioner of Patents, Washington, D. C."